(12) United States Patent
Okabe

(10) Patent No.: US 7,574,860 B2
(45) Date of Patent: Aug. 18, 2009

(54) DAMPER VALVE AND HYDRAULIC POWER STEERING APPARATUS

(75) Inventor: Osamu Okabe, Yamatokooriyama (JP)

(73) Assignee: JTEKT Corporation, Osaka (JP)

( * ) Notice: Subject to any disclaimer, the term of this patent is extended or adjusted under 35 U.S.C. 154(b) by 577 days.

(21) Appl. No.: 11/341,474

(22) Filed: Jan. 30, 2006

(65) Prior Publication Data

US 2006/0175122 A1 Aug. 10, 2006

(30) Foreign Application Priority Data

Feb. 8, 2005 (JP) ............................. 2005-032075

(51) Int. Cl.
*F16D 31/02* (2006.01)
*F15B 13/04* (2006.01)
*F16K 17/26* (2006.01)

(52) U.S. Cl. .................... 60/469; 91/447; 137/493.9

(58) Field of Classification Search ............... 60/469; 91/445, 446, 447, 468; 137/493.8, 493.9
See application file for complete search history.

(56) References Cited

U.S. PATENT DOCUMENTS 4,034,860 A 7/1977 Leppich 6,422,126 B1 7/2002 Hamano et al.
7,080,659 B2 7/2006 Umetani
2004/0050426 A1 * 3/2004 Umetani .................... 137/493

FOREIGN PATENT DOCUMENTS

| DE | 25 00 826 A1 | 7/1976 |
| EP | 0 791 764 A2 | 8/1997 |
| FR | 1 537 110 A | 8/1968 |
| JP | 2001-158369 | 6/2001 |
| JP | 2004-106642 | 4/2004 |

* cited by examiner

*Primary Examiner*—Michael Leslie
(74) *Attorney, Agent, or Firm*—Rabin & Berdo, PC

(57) ABSTRACT

A damper valve includes first and second chambers separated by a partition wall, hydraulic oil flowing from the first chamber to the second chamber via a supply path, and returning to the first chamber from the second chamber via a return path. A valve plate that is elastically deformable is urged toward a valve seat formed in the return path. The valve plate produces an elasticity restoring force so as to establish a balance between an urging force provided by an urging member and a reaction force provided by the valve plate, and is in line-contact with the valve seat when keeping the balance. The valve seat or the valve plate is formed into a conical tapered shape centered around the predetermined axis so that when the valve plate is abutted against the valve seat, an annular oil chamber is formed between the valve seat and the valve plate.

15 Claims, 10 Drawing Sheets

DAMPER VALVE AND HYDRAULIC POWER STEERING APPARATUS

BACKGROUND OF THE INVENTION

1. Field of the Invention

The present invention relates to a damper valve provided in a hydraulic circuit between a hydraulic source and a hydraulic actuator, and a hydraulic power steering apparatus using the same.

2. Description of Related Arts

Provided as a damper valve is a damper valve having a cylindrical casing, a cylindrical partition member for partitioning the casing into two chambers, a communication hole for communicating both end surfaces of the partition member with each other, a valve seat provided on one of the end surfaces of the partition member, a valve plate opposed to the valve seat for covering the communication hole, and a spring for urging the valve plate toward the one end surface of the partition member.

In order to prevent a valve plate from being affixed to a valve seat not to be easily separated therefrom, a damper valve in which a recess communicating with a communication hole is formed in the valve seat has been proposed (see Japanese Unexamined Patent Publication No. 2001-158369 and Japanese Unexamined Patent Publication No. 2004-106642).

However, the valve seat and the valve plate are brought into plane contact with each other, so that oil film cutting easily occurs. Consequently, it is difficult to reliably prevent the valve plate from being affixed to the valve seat. As a result, a steering feeling is liable to be bad.

Therefore, an object of the present invention is to provide a damper valve capable of effectively preventing a valve plate from being affixed to a valve seat and being not easily separated therefrom, and a hydraulic power steering apparatus using the same.

SUMMARY OF THE INVENTION

A preferred aspect of the present invention is to provide a damper valve comprising a casing having a first chamber, a second chamber, and a partition wall for separating the first chamber and the second chamber from each other. The damper valve comprises a supply path for supplying to the second chamber hydraulic oil in the first chamber, a return path for returning to the first chamber the hydraulic oil in the second chamber, a check valve provided in the supply path for regulating the circulation of the hydraulic oil from the second chamber to the first chamber, a valve seat provided in the partition wall and facing the first chamber. The damper valve also comprises an annular valve plate which is elastically deformable, accommodated in the first chamber and opposed to the valve seat and an urging member for urging a predetermined portion of the valve plate toward the valve seat. The supply path comprises a penetration path that penetrates the partition wall along a predetermined axis. The return path comprises a communication path that communicates the first chamber and the second chamber with each other by penetrating the partition wall. The communication path has an opening formed in the valve seat. Either one of the valve seat and the valve plate is formed into a conical tapered shape centered around the predetermined axis, so that when either of an outer edge or an inner edge of the valve plate is abutted against the valve seat, an annular oil chamber is formed between the valve seat and the valve plate and the opening in the communication path communicates with the annular oil chamber.

According to the present invention, an elasticity restoring force of the valve plate is exerted in the direction in which surface contact (all over abutment) between the valve plate and the valve seat is restrained, thereby making it possible to effectively prevent the valve plate from being affixed to the valve seat and being not easily separated therefrom. It is easy to form either one of the valve seat and the valve plate into a conical tapered shape, thereby making it possible to make manufacturing costs lower.

DETAILED DESCRIPTION OF THE PREFERRED EMBODIMENT

Embodiments of the present invention will be described in detail while referring to the accompanying drawings.

In the present embodiment, description is made in conformity with a hydraulic power steering apparatus comprising a hydraulic cylinder as a hydraulic actuator. As the hydraulic actuator in the hydraulic power steering apparatus, a hydraulic motor may be used.

Figure 1:
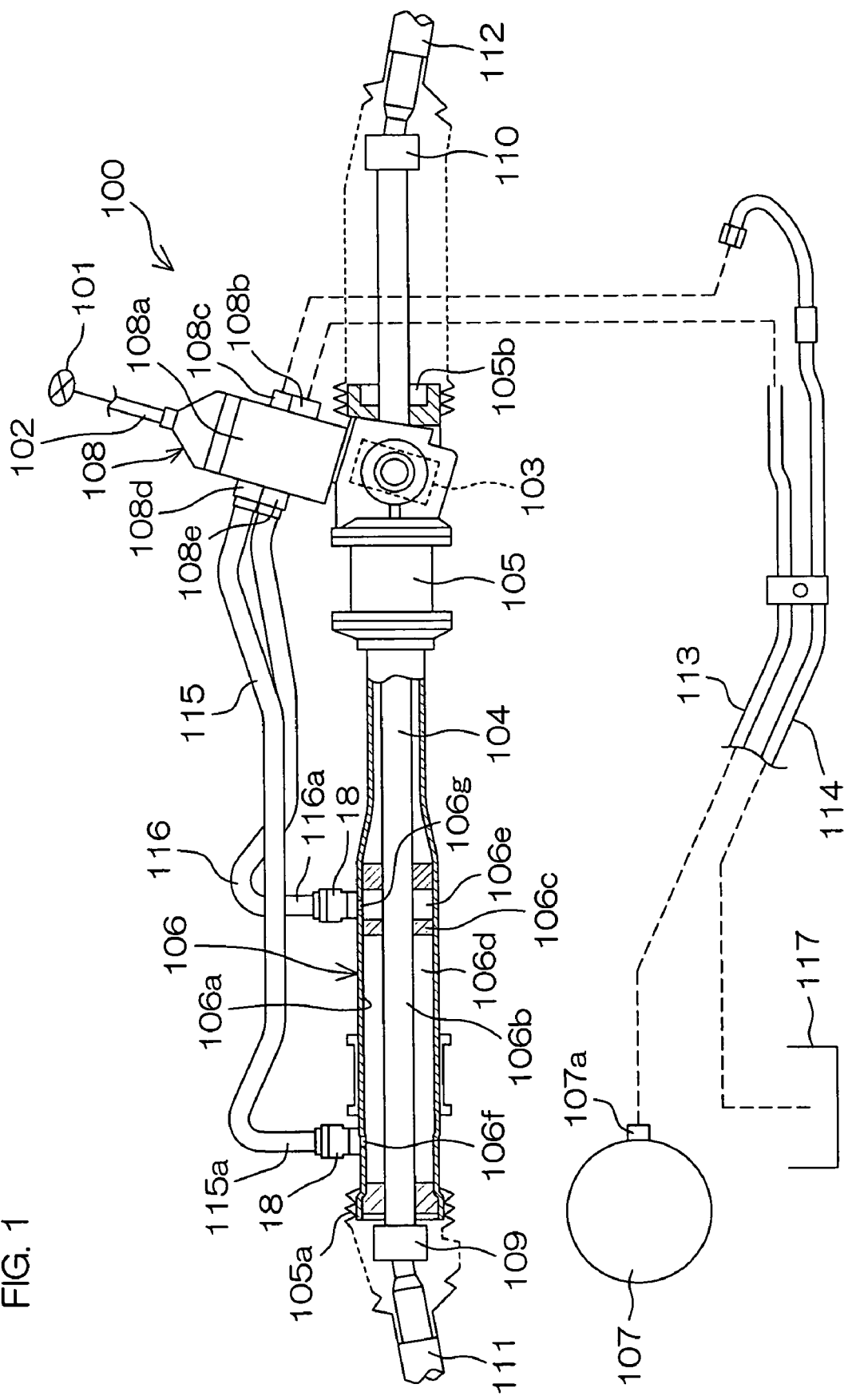
FIG. 1 is a schematic view of a hydraulic power steering apparatus according to a first embodiment of the present invention.

FIG. 1 is a schematic view of a hydraulic power steering apparatus according to a first embodiment of the present invention.

Referring to FIG. 1, in a hydraulic power steering apparatus 100, an input shaft 102 connected to a steering wheel 101, a pinion 103 rotated as the input shaft 102 is rotated, a rack shaft 104 meshed with the pinion 103, a housing 105 covering the rack shaft 104, a hydraulic cylinder 106 serving as a hydraulic actuator provided inside the housing 105, a hydraulic pump 107 serving as a hydraulic source for supplying hydraulic oil to the hydraulic cylinder 106, and a hydraulic control valve 108 interlocked with the steering wheel 101 for controlling supply and discharge of hydraulic oil to and from the hydraulic cylinder 106 constitute a principal part.

Both ends of the rack shaft 104 respectively project from openings 105a and 105b at both ends of the housing 105, and ball joints 109 and 110 are respectively integrated with their projecting ends. Tie rods 111 and 112 are respectively mounted on the ball joints 109 and 110, and the both ends of the rack shaft 104 are connected to a steerable wheel (not shown) through the tie rods 111 and 112. By a rotation operation of the steering wheel 101, therefore, the pinion 103 is rotated through the input shaft 102, and the rack shaft 104 is moved in an axial direction (along the vehicle width), thereby allowing a vehicle to be steered.

The hydraulic cylinder 106 has a cylinder tube 106a composed of a part of the housing 105, a piston rod 106b composed of the rack shaft 104, and a piston 106c integrated with the rack shaft 104. Spaces which are opposite to each other with the piston 106c are respectively constructed as a first oil chamber 106d and a second oil chamber 106e. A first input port 106f communicating with the first oil chamber 106d and a second input port 106g communicating with the second oil chamber 106e are formed in the cylinder tube 106a.

The hydraulic control valve 108 is composed of a rotary valve, and an input port 108b, a return port 108c, a first output port 108d, and a second output port 108e are respectively formed so as to project from the valve housing 108a. The input port 108b is connected to an output port 107a on the hydraulic pump 107 through a first hydraulic pipe 113, and the return port 108c is connected to a reserving oil tank 117 through a second hydraulic pipe 114. The first output port 108d is connected to the first oil chamber 106d in the hydraulic cylinder 106 through a third hydraulic pipe 115 serving as a connection path, and the second output port 108e is connected to the second oil chamber 106e in the hydraulic cylinder 106 through a fourth hydraulic pipe 116 serving as a connection path.

The hydraulic control valve 108 supplies steering force assisting hydraulic oil from the hydraulic pump 107 to either one of the first oil chamber 106d and the second oil chamber 106e depending on a steering direction and a steering resistance and at the same time, returns the hydraulic oil to the oil tank 117 from the other oil chamber. Consequently, the hydraulic cylinder 106 outputs a steering assist force.

In this type of hydraulic power steering apparatus, there may occur a so-called shimmy phenomenon that the steerable wheel is excessively vibrated during travel due to the precision of a steering system part, for example, and the vibration is transmitted to a steering wheel through a piston rod (a rack shaft) in a hydraulic cylinder, for example. In order to restrain the shimmy effect, a dumper valve 18 is mounted on each of an end 115a serving as a predetermined portion of the third hydraulic pipe 115 serving as a hydraulic circuit and an end 116a serving as a predetermined portion of the fourth hydraulic pipe 116.

Specifically, the third hydraulic pipe 115 comprises a metal pipe, and the metal pipe is connected to the first input port 106f in the hydraulic cylinder 106 through the damper valve 18. The fourth hydraulic pipe 116 comprises a metal pipe, and the metal pipe is connected to the second input port 106g in the hydraulic cylinder 106 through the damper valve 18.

Each of the damper valves 18 has a function serving as a check valve that allows flow of hydraulic oil from the hydraulic control valve 108 to the hydraulic cylinder 106 and a function serving as a throttling check valve that allows flow of hydraulic oil in a direction opposite to the flow of hydraulic oil from the hydraulic control valve 108 to the hydraulic cylinder 106 with a predetermined resistance.

The damper valve 18 provided in the third hydraulic pipe 115 and the damper valve 18 provided in the fourth hydraulic pipe 116 are constructed similarly to each other. Description is now made in conformity with the damper valve 18 provided in the third hydraulic pipe 115.

Figure 2:
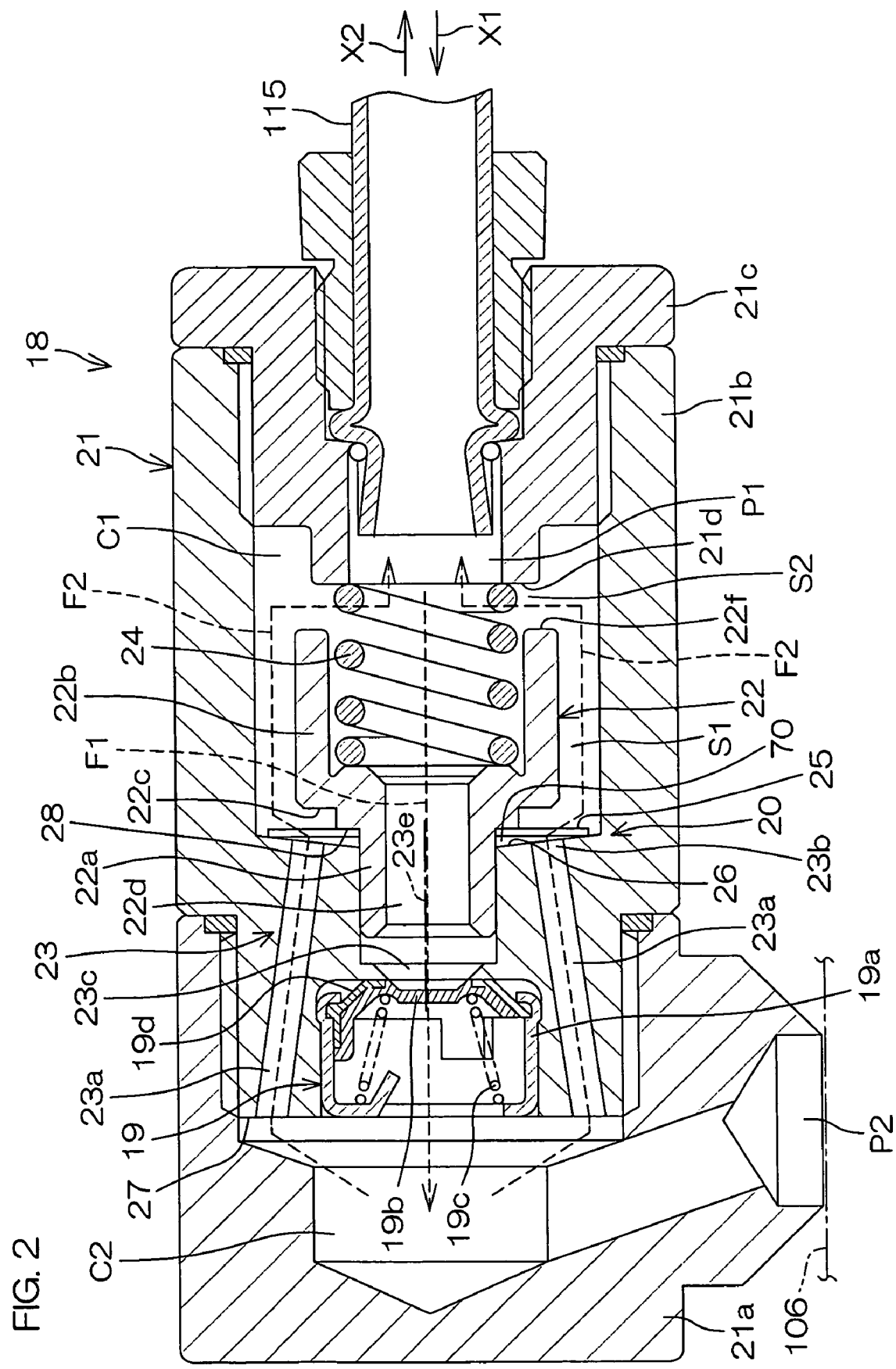
FIG. 2 is a cross-sectional view of a damper valve according to the first embodiment of the present invention.

FIG. 2 is a cross-sectional view of the damper valve 18 according to the first embodiment of the present invention.

Referring to FIG. 2, a supply path F1 for supplying hydraulic oil to the hydraulic cylinder 106 and a return path F2 for causing the hydraulic oil to flow out of the hydraulic cylinder 106 are defined inside the damper valve 18. The supply path F1 and the return path F2 are separated from each other, each of the paths allows only the circulation of hydraulic oil in the corresponding one direction, and their both ends communicate with each other. The supply path F1 is provided with a first valve 19 having the function of the check valve (also referred to as a check valve) 19. Further, the return path F2 is provided with a second valve 20 having the function of the drawing check valve.

Specifically, the damper valve 18 comprises a hollow casing 21, a partition wall 23 for partitioning the casing 21 into a first chamber C1 and a second chamber C2, a check valve 19 serving as the first valve provided inside the partition wall 23, a valve plate 25 for composing the second valve 20, and a coil spring 24 serving as an urging member for urging the valve plate 25 through a holding member 22.

The second valve 20 has a valve seat 26 provided on the partition wall 23 and facing the first chamber C1, and the above-mentioned valve plate 25 opposed to the valve seat 26.

In the present embodiment, when the valve seat 26 is formed into a conical tapered surface, and the second valve 20 is brought into a closed state, the valve plate 25 in a plane-like annular disk shape is brought into line contact with the valve seat 26. Consequently, it is possible to prevent the valve plate 25 from being affixed to the valve seat 26. As a result, the conventional problem, that is, that when a valve plate is affixed to a valve seat, a driver feels a predetermined load in steering until the valve plate is separated from the valve seat may occur. However, such a problem is solved, thereby a steering feeling is improved.

The casing 21 has a flare pipe 21a, a first connector 21b connected to the flare pipe 21a, and a second connector 21c whose front end is screwed into the first connector 21b. The partition wall 23 is integrally formed at one end inside the first connector 21b. The casing 21 has a hollow shape as a whole by the flare pipe 21a, the first connector 21b, and the second connector 21c. The casing 21 has the first chamber C1 and the second chamber C2 that are separated from each other by the partition wall 23, a first port P1 communicating with the first chamber C1, and a second port P2 communicating with the second chamber C2.

Referring to FIGS. 1 and 2, the first port P1 is connected to a metal pipe in a third hydraulic pipe 115 serving as a portion nearer to the hydraulic pump 107 than to the first port P1 in the hydraulic circuit. The second port P2 is connected to the first input port 106f on the hydraulic cylinder 106 serving as a portion nearer the hydraulic cylinder 106 than to the second port P2 in the hydraulic circuit. The first chamber C1 communicates with the hydraulic control valve 108 through the first port P1 and the metal pipe in the third hydraulic pipe 115 in this order. The second chamber C2 communicates with the first oil chamber 106d in the hydraulic cylinder 106 through the second port P2.

Referring to FIG. 2, the partition wall 23 has the valve seat 26 composed of an annular end surface provided at one end to face the first chamber C1, and an annular end surface 27 arranged at the other end to face the second chamber C2 in axial directions X1 and X2. Here, the axial directions X1 and X2 are directions in which an axis 23e of a penetration path 23c in the partition wall 23 extends, the axial direction X1 being a direction from the first chamber C1 to the second chamber C2, and the axial direction X2 being a direction from the second chamber C2 to the first chamber C1.

The partition wall 23 has a plurality of communication paths 23a arranged equally spaced apart on the circumference centered around the axis 23e and penetrating the partition wall 23, and the penetration path 23c penetrating the partition wall 23 along the axis 23e. The communication path 23a and the penetration path 23c are respectively formed so that they can communicate the first chamber C1 and the second chamber C2 with each other. A part of the penetration path 23c constitutes a guide section facing the first chamber C1 for guiding the holding member 22, and another part of the penetration path 23c constitutes a holding section facing the second chamber C2 for holding the check valve 19.

Figure 3:
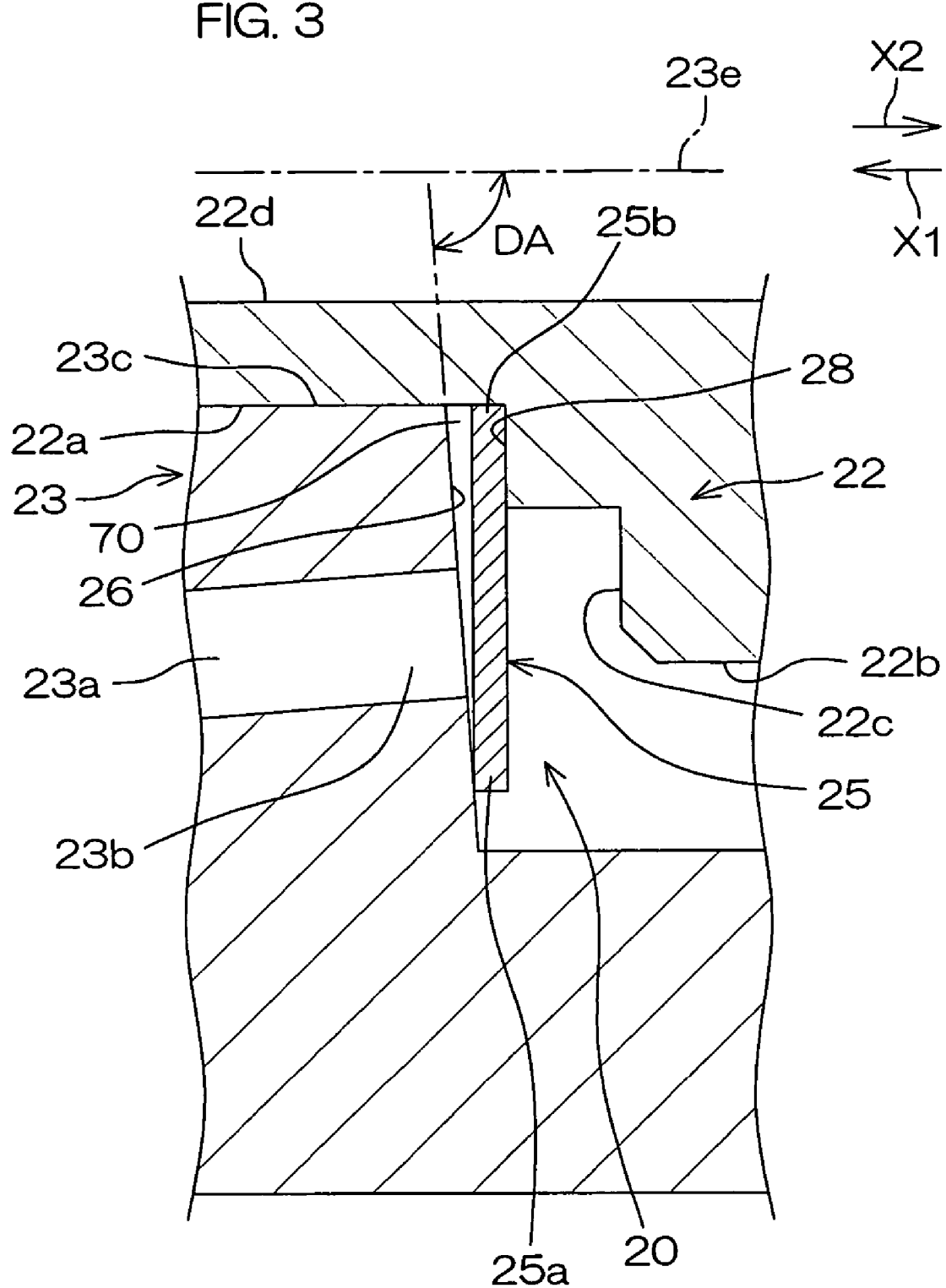
FIG. 3 is a cross-sectional view of a principal part in a state where the damper valve shown in FIG. 2 is closed.

FIG. 3 is a cross-sectional view of the second valve 20 serving as a principal part of the dumper valve 18 according to the first embodiment of the present invention and its peripheral part, showing a closed state. Refer to FIG. 3.

In the present embodiment, the whole valve seat 26 is formed by a conical tapered surface having the axis 23e of the penetration hole 23c in the partition wall 23 as its center. The valve seat 26 is recessed in the axial direction X1. The closer a portion of the valve seat 26 is to an inner peripheral edge thereof, the deeper a recess of the portion is. In the valve seat 26, a plurality of openings 23b forming one end of the communication path 23a are arranged equally distributed on the circumference centered around the axis 23e.

Returning to FIG. 2, the holding member 22 has a stepped cylindrical shape. The holding member 22 is arranged concentrically with the axis 23e of the partition wall 23. The holding member 22 has a small-diameter section 22a having a small outer diameter and having a cylindrical shape and a large-diameter section 22b having a large outer diameter and having a cylindrical shape.

In the small-diameter section 22a and the large-diameter section 22b, penetration holes 22d serving as their inner parts are respectively formed. The penetration hole 22d allows the circulation of hydraulic oil.

A diameter of the inner periphery of the large-diameter section 22b is made larger than the diameter of the inner periphery of the small-diameter section 22a. The coil spring 24 is arranged inside the large-diameter section 22b. A receiving section that receives the coil spring 24 is provided on an inner sidewall, nearer to the small-diameter section 22a, of the large-diameter section 22b.

A stepped end surface is formed between the outer periphery of the small-diameter section 22a and the outer periphery of the large-diameter section 22b. A receiving section 28 for receiving the inner edge 25b of the valve plate 25 is provided in an inner part in the radial direction of the end surface, and a relief section 22c for allowing the valve plate 25 to be elastically deformed is provided in an outer part in the radial direction of the end surface.

The small-diameter section 22a is fitted in a guide portion of the penetration hole 23c in the partition wall 23, and is movable in the axial directions X1 and X2 relative to the partition wall 23 along the guide portion.

An annular spacing S1 is provided between the outer periphery of the large-diameter section 22b and the inner periphery of the first chamber C1. In addition thereto, a spacing S2 is provided between an end 22f in the axial direction X2 of the holding member 22 and the end 21d in the axial direction X1 of the second connector 21c. The clearances S1 and S2 are respectively set to predetermined amounts, to allow the circulation of hydraulic oil.

The supply path F1 comprises the penetration hole 23c in the partition wall 23 and the penetration hole 22d in the holding member 22 so that hydraulic oil supplied to the first chamber C1 through the first port P1 can be supplied to the second chamber C2 through the penetration hole 22d in the holding member 22 and the penetration hole 23c in the partition wall 23 in this order.

The return path F2 comprises the communication path 23a in the partition wall 23, the clearance S1, and the clearance S2 so that hydraulic oil returned toward the first chamber C1 from the second chamber C2 can be circulated to the first chamber C1 through the communication path 23a and further introduced into the first port P1.

The check valve 19 allows hydraulic oil to be circulated from the first port P1 to the second port P2, and regulates a circulation of hydraulic oil in the opposite direction to the above-mentioned circulation. The check valve 19 is arranged in the supply path F1 inside the partition wall 23, specifically, in the holding portion of the penetration hole 23c.

The check valve 19 comprises a cylindrical case 19a fixed in a press-fitted state to the holding portion of the penetration hole 23c in the partition wall 23, a movable valve member 19b arranged inside the case 19a so as to be movable in the axial directions X1 and X2, a coil spring 19c accommodated inside the case 19a for urging the movable valve member 19b, and a ring-shaped valve seat member 19d, on which the movable valve member 19b is seated, attached to the case 19a. The constituent members are assembled to form an integral unit, thereby constituting the check valve 19.

Referring to FIGS. 1 and 2, the check valve 19 is opened when hydraulic oil is circulated toward the first oil chamber 106d in the hydraulic cylinder 106 from the hydraulic control valve 108 during a steering operation, while being closed in other case.

At normal time when the steering operation is not performed, for example, the check valve 19 is closed. The movable valve member 19b is brought into close contact with the valve seat member 19d from the second chamber C2 by an urging force of the coil spring 19c, to close an opening provided at the center of the valve seat member 19d. Thus, the check valve 19 brings the penetration hole 23c in the partition wall 23 into a closed state, to prevent a flow of hydraulic oil that returns toward the hydraulic control valve 108 from the hydraulic cylinder 106.

When the steering operation is performed as described above, the check valve 19 is opened. At this time, the movable valve member 19b is separated from the valve seat member 19d against an urging force of the coil spring 19c by pressure of hydraulic oil that flows toward the hydraulic cylinder 106 from the hydraulic control valve 108 accompanying to the steering operation. Consequently, the penetration hole 23c in the partition wall 23 is opened, so that the hydraulic oil from the hydraulic control valve 108 is supplied to the first oil chamber 106d in the hydraulic cylinder 106 in a direction corresponding to the steering direction of the steering wheel 101 after successively passing through the supply path F1 and the second port P2 from the first port P1.

Referring to FIGS. 2 and 3, the valve plate 25 comprises an annular disc spring composed of a metallic thin plate. The valve plate 25 is formed to have such dimensions that it can cover the opening 23b facing the first chamber C1 in the communication path 23a. The inner edge 25b of the valve plate 25 is formed so as to have dimensions equal to the inner diameter of the valve seat 26, and is abutted against a receiving section 28 in the holding member 22 and fitted so as to be movable integrally with the outer periphery of the small-diameter section 22a in the holding member 22. An outer edge 25a of the valve plate 25 is formed so as to have dimensions substantially equal to or smaller than the outer diameter of the valve seat 26.

Figure 4:
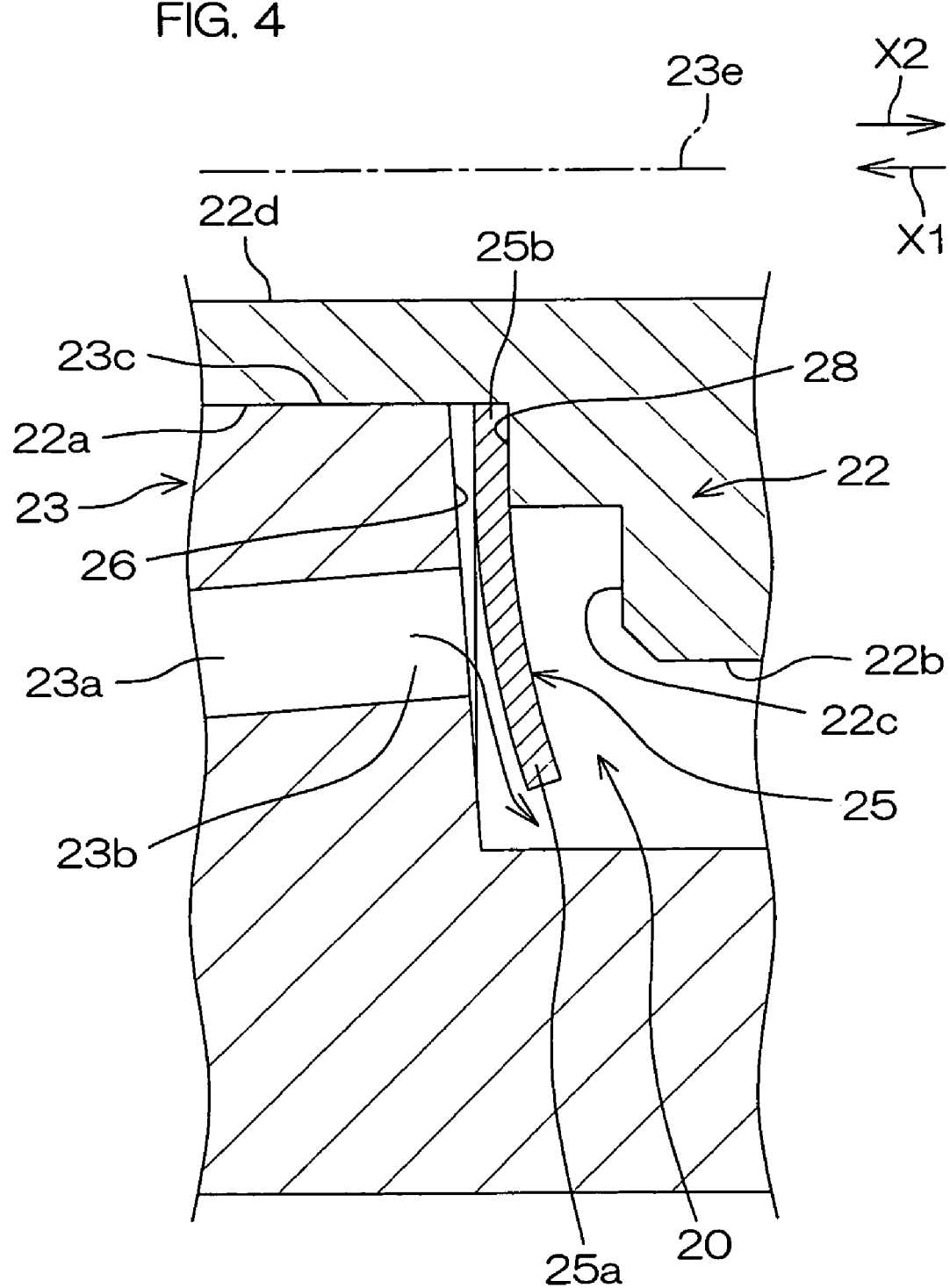
FIG. 4 is a cross-sectional view in a state where a valve plate shown in FIG. 3 is elastically deformed.

FIG. 4 is a cross-sectional view in a state where the second valve 20 shown in FIG. 3 is opened. Referring to FIGS. 3 and 4, the thickness of the valve plate 25 is set to such a value that the outer periphery of the valve plate 25 can be elastically deformed by hydraulic oil with a low flow rate returned through the communication path 23a. An amount of the elastic deformation gradually increases as the flow rate of the hydraulic oil increases. Consequently, the communication path 23a can be subtly opened or closed depending on a flow rate of the hydraulic oil.

Referring to FIG. 2, the coil spring 24 is composed of a compression spring, to urge the holding member 22 toward the second chamber C2 along the axial direction X1 by a predetermined force and press the valve plate 25 toward the valve seat 26 on the partition wall 23 through the holding member 22. The coil spring 24 is interposed in a state where it is elastically contracted between the holding member 22 and the second connector 21c so as to expand and contract depending on a flow rate of the hydraulic oil that returns along the return path F2.

The second valve 20 is opened when the hydraulic oil is returned at a flow rate of not less than the first predetermined flow rate along the return path F2, while being closed in other cases. For example, when there is no hydraulic oil returned from the first oil chamber 106d in the hydraulic cylinder 106 to the hydraulic control valve 108, and the flow rate of the hydraulic oil thus returned is very low, the second valve 20 is closed.

Referring to FIGS. 2 and 3, the valve plate 25 covers the opening 23b at a position apart from the opening 23b in a state where the second valve 20 is closed. The coil spring 24 urges the inner edge 25b of the valve plate 25 toward the valve seat 26 in a state where a clearance is provided between the inner edge 25b of the valve plate 25 and the valve seat 26. On the other hand, only the outer edge 25a of the valve plate 25 is in annular contact with the valve seat 26 substantially in a line contact state. As a result, an annular oil chamber 70 is formed between the valve plate 25 and the valve seat 26.

The opening 23b in each of the communication paths 23a is opened to the annular oil chamber 70, so that hydraulic oil is introduced into the annular oil chamber 70 from the communication path 23a. Consequently, it is possible to prevent oil film cutting from occurring in the valve seat 26. As a result, it is possible to effectively prevent from occurring a so-called affixation phenomenon that the valve plate 25 adheres to the valve seat 26 not to be easily separated therefrom.

The inner edge 25b of the valve plate 25 receives an urging force (a leftward force in FIG. 3) toward the valve seat 26 from the coil spring 24, while the outer edge 25a receives a reaction force (a rightward force in FIG. 3) in the opposite direction to the urging force from the valve seat 26. An elasticity restoring force is produced in the valve plate 25 so as to be balanced with the reaction force and the urging force. The elasticity restoring force is exerted in a direction in which surface contact between the valve plate 25 and the valve seat 26 is restrained, and it is specifically exerted so as to separate the inner edge 25b of the valve plate 25 from the valve seat 26 with the outer edge 25a used as a support.

Referring to FIGS. 1 and 2, when a piston rod 106b in the hydraulic cylinder 106 is vibrated rightward and leftward as the steerable wheel is slightly vibrated, the second valve 20 is opened a little. That is, a flow of hydraulic oil that returns from the first oil chamber 106d to the hydraulic control valve 108 is produced by the vibration at a low flow rate. When the flow rate at this time exceeds the first predetermined flow rate, the valve plate 25 in the damper valve 18 is elastically deformed depending on the flow rate so that the pressure of the flow causes the opening 23b to be opened wider as shown in FIGS. 3 and 4. In this case, the return path F2 is drawn by the valve plate 25, so that a damper effect is exhibited. Therefore, the vibration from the steerable wheel is prevented from being transmitted to the steering wheel 101 through the piston rod 106b in the hydraulic cylinder 106. On the other hand, when a driver performs rapid steering, hydraulic oil returned toward the hydraulic control valve 108 from the first oil chamber 106d in the hydraulic cylinder 106 increases in amount. When a flow rate of the hydraulic oil thus returned is higher than a second predetermined flow rate which is set to a higher value than the first predetermined flow rate, the second valve 20 is opened wide.

Figure 5:
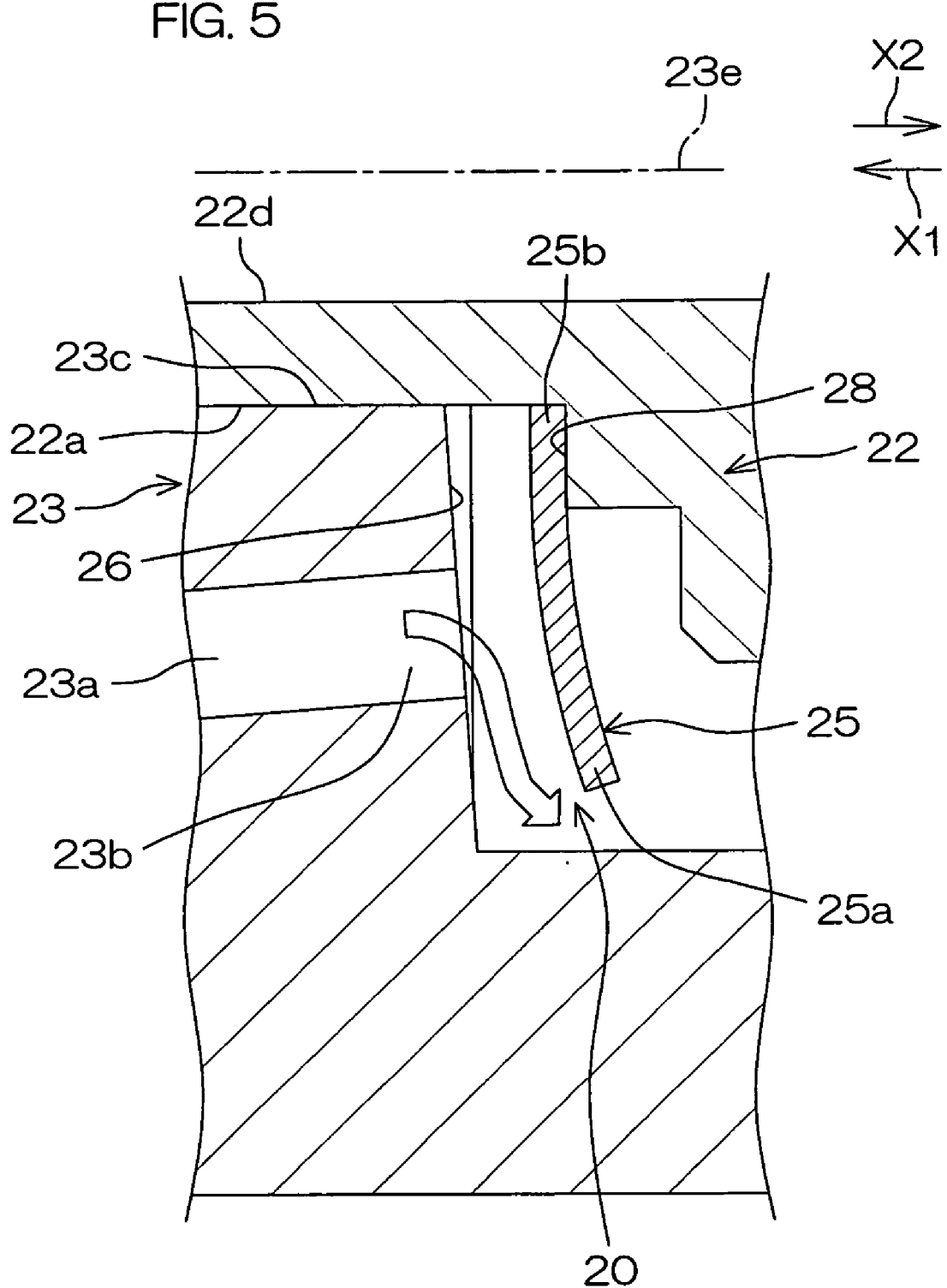
FIG. 5 is a cross-sectional view in a state where the valve plate shown in FIG. 3 is opened wider than in the state shown in FIG. 4.

FIG. 5 is a cross-sectional view in a state where the second valve 20 is opened wider than that in the state shown in FIG. 4. Referring to FIGS. 2 and 5, the valve plate 25 is elastically deformed by hydraulic oil returned at a high flow rate so that the opening 23b is opened wider. Correspondingly, an amount of compression of the coil spring 24 is relatively increased by a force of hydraulic oil with a high flow rate urging the valve plate 25. As a result, the valve plate 25, together with the holding member 22, is moved against an urging force of the coil spring 24 and is greatly separated from the valve seat 26 in the partition wall 23, to open the opening 23b wider.

Referring to FIGS. 1 and 5, The second valve 20 is opened wide as described above, so that hydraulic oil from the hydraulic cylinder 106 is smoothly returned to the hydraulic control valve 108 through the second valve 20 in the damper valve 18. As a result, a steering assist force is prevented from being lowered so that it is possible to prevent such a problem from occurring that the steering wheel 101 abnormally increases in weight.

Referring to FIG. 2, in the embodiment of the present invention, the valve seat 26 in the partition wall 23 is formed into a conical tapered surface. Consequently, an elasticity restoring force of the valve plate 25 is exerted in a direction in which surface contact (solid abutment) between the valve plate 25 and the conical tapered surface is restrained, thereby making it possible to effectively prevent the valve plate 25 from being affixed to the valve seat 26 and being not easily separated therefrom. Further, the conical tapered surface can be formed at lower cost, as compared with that in case where a recess is formed on its end surface. In order to obtain this effect, the valve seat 26 may include the conical tapered surface.

Referring to FIG. 3, the outer edge 25a of the valve plate 25 and the valve seat 26 in the partition wall 23 are substantially brought into line contact, thereby making it possible to more effectively prevent the valve plate 25 from being affixed to the valve seat 26 on the partition wall 23 and being not easily separated therefrom. Hydraulic oil with a low flow rate can be reliably prevented by the outer edge 25a of the valve plate 25 while maintaining the above-mentioned line contact by utilizing the elasticity restoring force of the valve plate 25.

In the hydraulic power steering apparatus 100 (see FIG. 1) comprising the damper valve 18 according to the present embodiment, an affixation phenomenon between the valve seat 26 on the partition wall 23 and the valve plate 25 in the damper valve 18 can be prevented from occurring, thereby making it possible to prevent a steering feeling from degrading.

In a cross section including the axis 23e, it is preferable that an angle DA that is an angle formed between the valve seat 26 and the axis 23*e* and on the side of a portion where the valve plate 25 exists is an acute angle, thereby making it possible to obtain the above-mentioned effect by using the plate-shaped valve plate 25. It is more preferable that the angle DA is set to a value larger than 89.0 degrees. Thus, the valve seat 26 is similar to a flat shape. Therefore, substantially the same damper effect as that in a conventional second valve in which both of an end surface and a valve plate are flat can be obtained, so that practical applications can be easily made. It is more preferable that the angle DA is set to a value smaller than 89.5 degrees. Thus, the valve seat 26 and the valve plate 25 are reliably brought into line contact. Further, it is more preferable that the angle DA is set to a value within a range from 89.0 degrees to 89.5 degrees.

When the angle DA is set to a small value that is less than 89.0 degrees, a degree at which the shape of the valve seat 26 is similar to a flat surface is reduced, so that damper characteristics may differ from those in the conventional example. When the angle DA is set to a large value exceeding 89.5 degrees, the valve seat 26 and the flat valve plate 25 may be brought into surface contact so that affixation cannot be restrained.

The following modified example can be considered with respect to the present embodiment. In the following description, points different from those in the above-mentioned embodiment will be described, and the same constituent elements are assigned the same reference numerals and hence, the description thereof is not repeated.

For example, in the first embodiment, it can be also considered that the angle of inclination DA of a tapered surface is made smaller than 89 degrees, for example.

Figure 6:
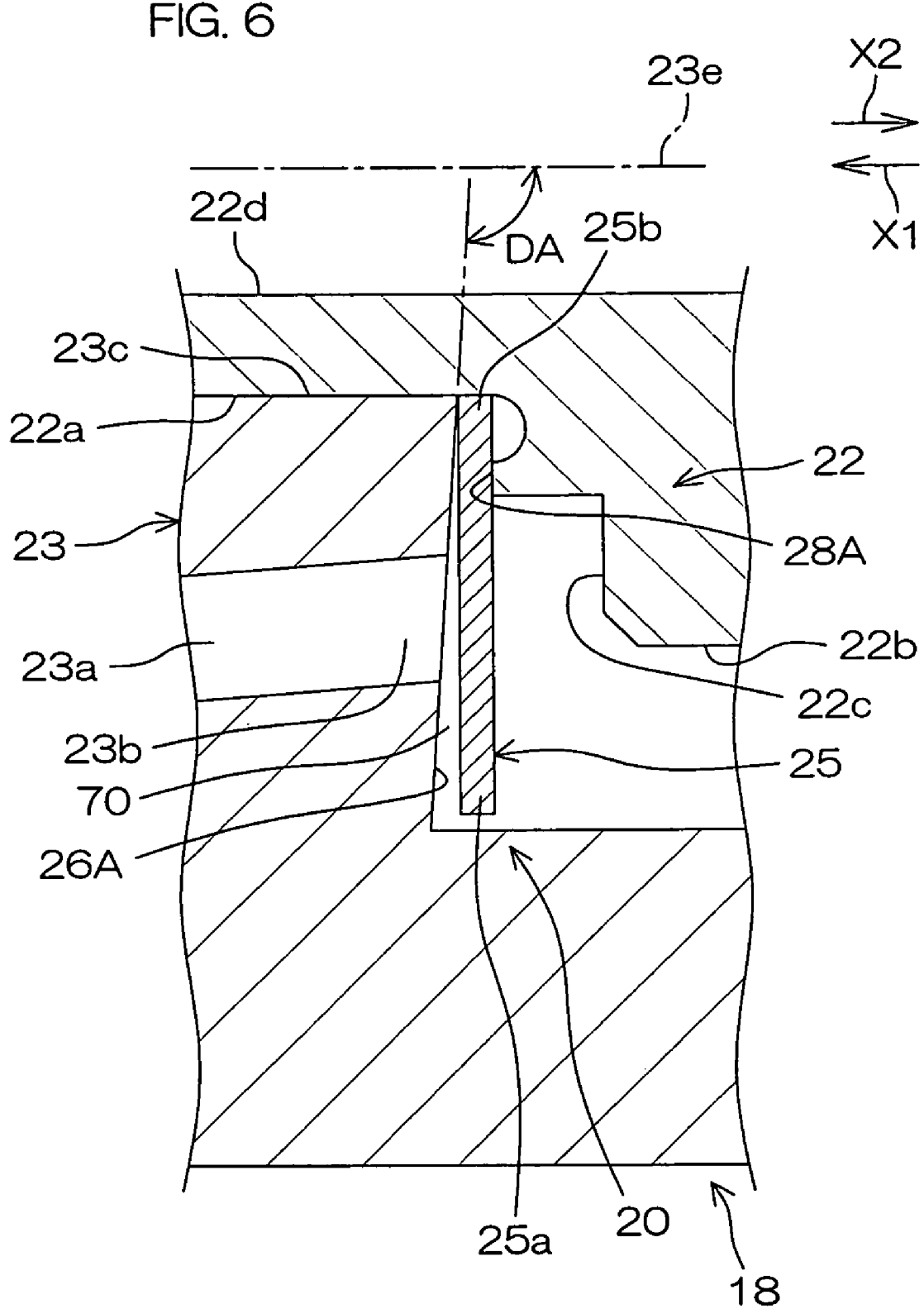
FIG. 6 is a cross-sectional view of a principal part of a damper valve according to a second embodiment of the present invention.

FIG. 6 is a cross-sectional view of a second valve 20 serving as a principal part of a damper valve according to a second embodiment of the present invention and its peripheral portion of the second valve 20.

In a damper valve 18 according to the second embodiment, a valve seat 26A in a partition wall 23 is formed into a conical tapered surface inclined in a direction opposite to the valve seat 26 in the embodiment shown in FIG. 1, and the above-mentioned angle DA is an obtuse angle. A receiving section 28A in a holding member 22 is composed of projections provided radially outward away from an inner edge 25*b* of a valve plate 25 spaced by a predetermined distance, and the projection has an annular shape centered around an axis 23*e* to receive a vicinity of the inner edge 25*b* of the valve plate 25.

As shown in FIG. 6, in a state where a second valve 20 is closed, only the inner edge 25*b* of the valve plate 25 is abutted against the valve seat 26 in a line contact state, and the outer edge 25*a* is separated from the valve seat 26A. Consequently, an annular oil chamber 70 is formed between the valve plate 25 and the valve seat 26A. An elasticity restoring force of the valve plate 25 is exerted in a direction in which surface contact (solid abutment) between the valve plate 25 and the conical tapered surface is restrained. Consequently, it is possible to effectively prevent the valve plate 25 from being affixed to the valve seat 26A on the partition wall 23 and being not easily separated therefrom.

In the second embodiment, the valve plate 25 does not completely close an opening 23*b*, and a small amount of hydraulic oil is freely returned, so that a so-called ON/OFF feeling of a driver can be suppressed due to rapid return of the hydraulic oil.

In the first embodiment, only a portion in a radial direction of the valve seat 26 that is a portion where the valve seat 26 and the valve plate 25 are abutted against each other in a line contact state may be formed into a conical tapered surface. The valve seat 26 may also be formed into an R shape. It can be said that the valve seat 26 in this case comprises a lot of conical tapered surfaces that gradually differ in angle of inclination, and that the conical tapered surfaces form an R shape. Such a modified example can be also considered regarding the valve seat 26A in the second embodiment.

Figure 7:
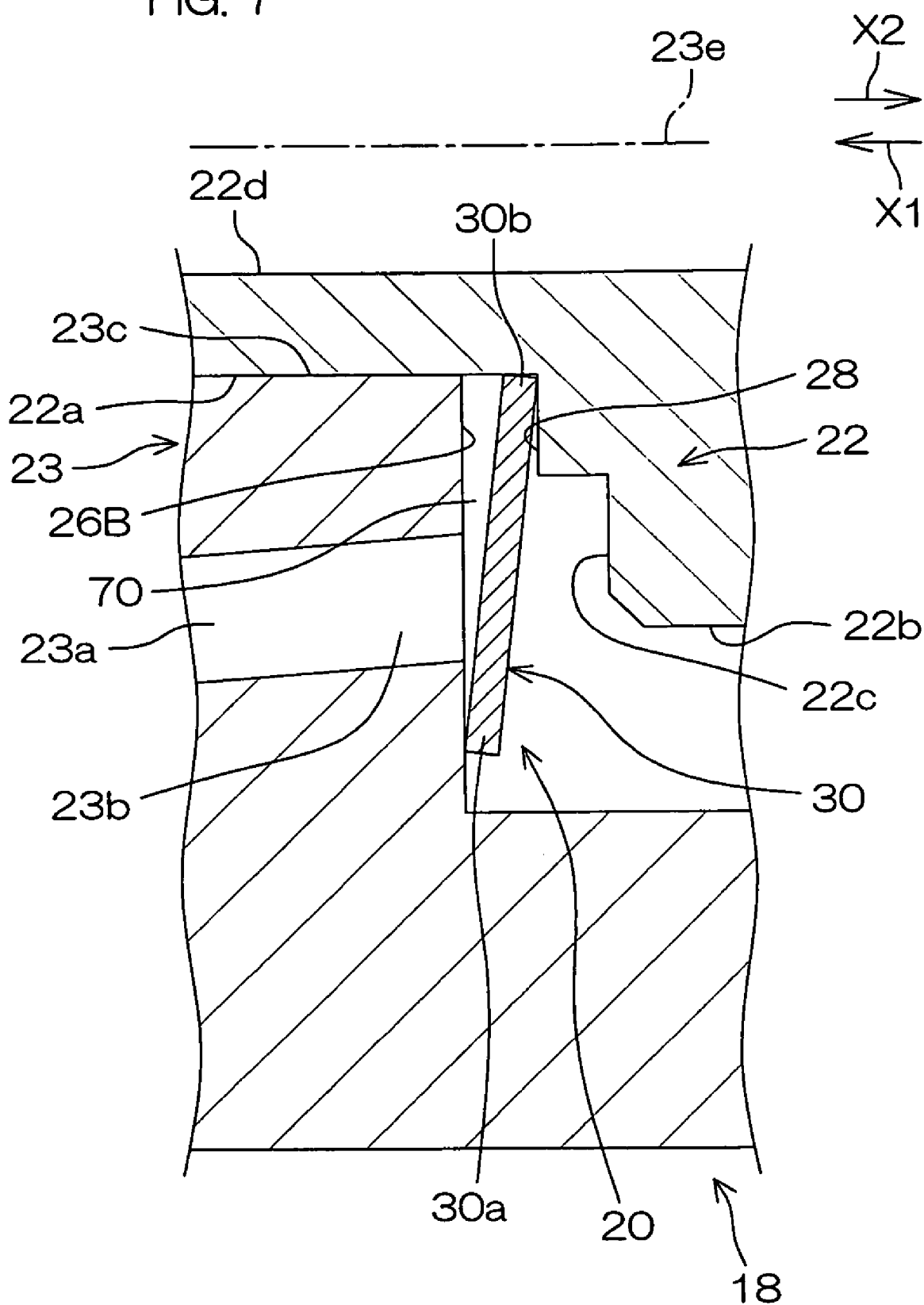
FIG. 7 is a cross-sectional view of a principal part in a state where a damper valve according to a third embodiment of the present invention is closed.

FIG. 7 is a cross-sectional view of a second valve 20 serving as a principal part of a damper valve according to a third embodiment of the present invention and peripheral portion of a second valve 20, showing a closed state.

In a damper valve 18 according to the third embodiment, a valve seat 26B on a partition wall 23 is formed into a flat annular surface that crosses at right angles to an axis 23*e*. The second valve 20 has the valve seat 26B and a valve plate 30. The valve plate 30 is composed of a disc spring having a conical shape in an unloaded state, and an inner edge 30*b* of the valve plate 30 is arranged in an axial direction X2 away from an outer edge In a state where the second valve 20 is closed, a predetermined clearance is provided between the inner edge 30*b* of the valve plate 30 urged by a coil spring 24 through a receiving section 28 of a holding member 22 and a valve seat 26. An outer edge 30*a* and the valve seat 26 are substantially brought into line contact, so that the valve plate 30 covers an opening 23*b*, thereby preventing the circulation of hydraulic oil. An annular oil chamber 70 is defined between the valve plate 30 and the valve seat 26, and the opening 23*b* communicates with the annular oil chamber 70.

The valve plate 30 composed of a disc spring in a conical shape produces an elasticity restoring force exerting so that the disc spring is returned to the conical shape when it receives such a force as to make the disc spring flat.

Figure 8:
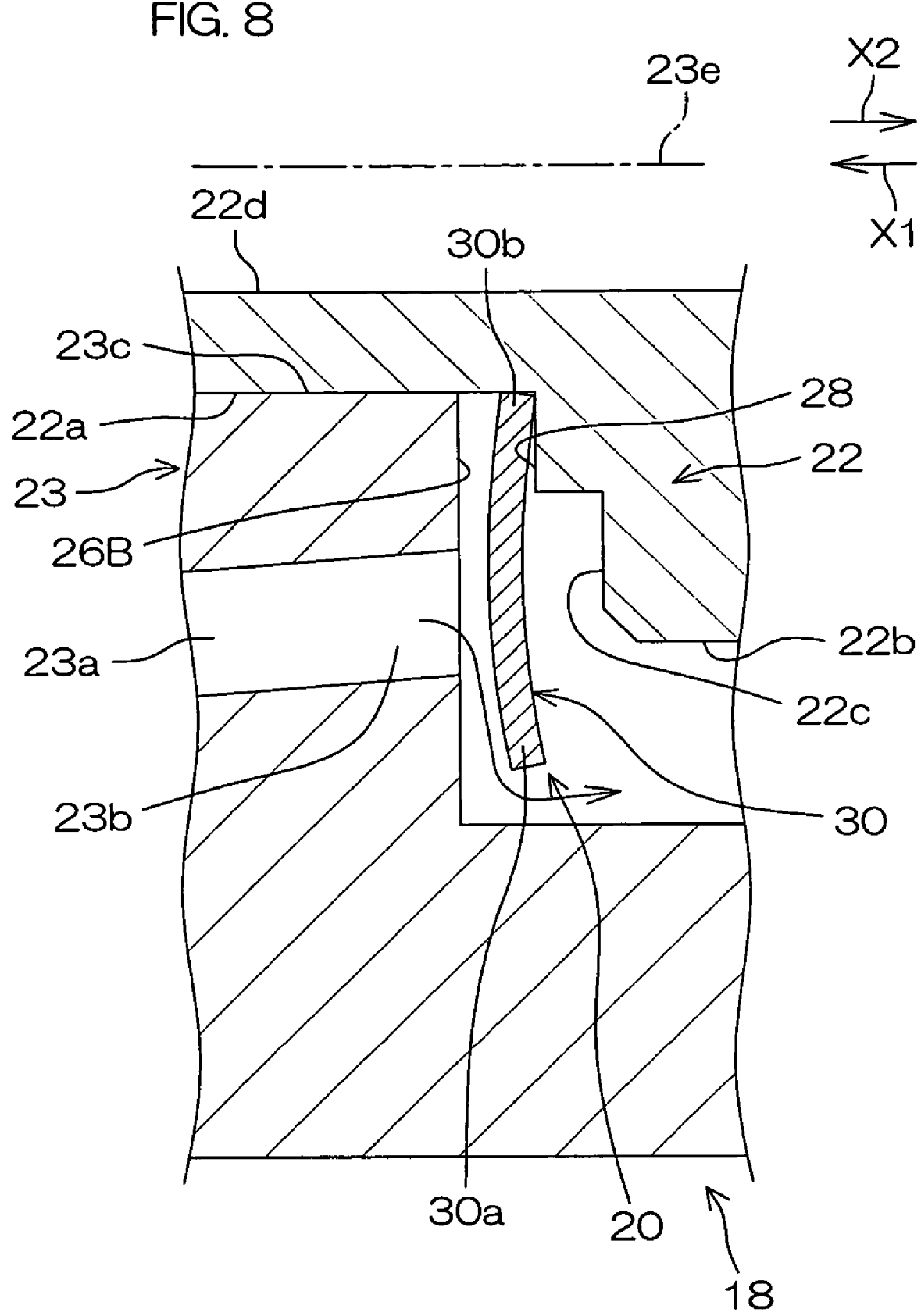
FIG. 8 is a cross-sectional view in a state where a valve plate shown in FIG. 7 is elastically deformed.
Figure 9:
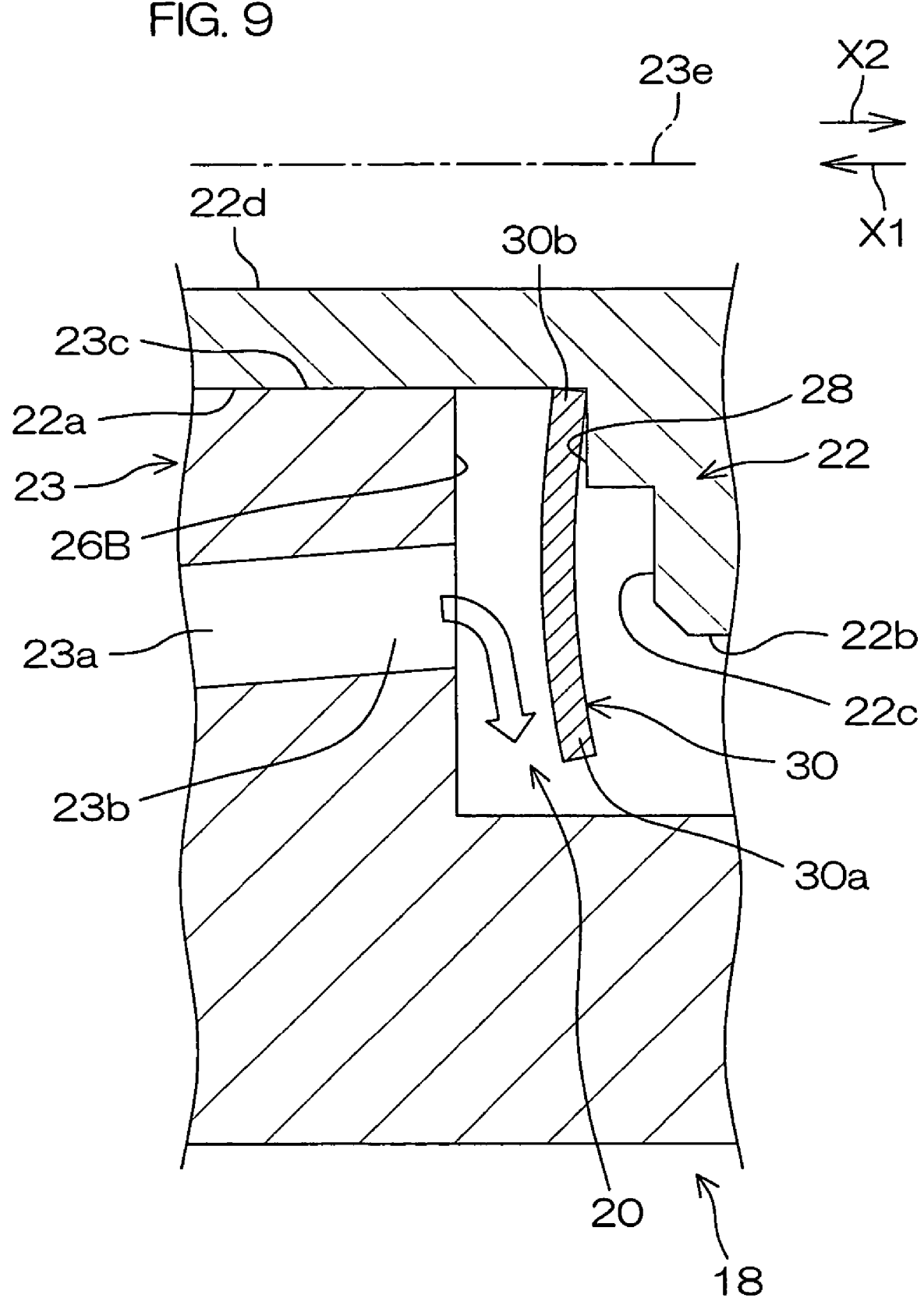
FIG. 9 is a cross-sectional view in a state where the valve plate shown in FIG. 7 is opened wider than in the state shown in FIG. 8.

FIG. 8 is a cross-sectional view in a state where the second valve 20 shown in FIG. 7 is opened. FIG. 9 is a cross-sectional view in a state where the second valve 20 shown in FIG. 7 is opened wider than that in the state shown in FIG. 8.

When a flow rate of the hydraulic oil to be returned is relatively low, higher than a first predetermined flow rate and lower than a second predetermined flow rate, as shown in FIG. 8, a circulation of hydraulic oil is allowed by only elastical deformation of the valve plate 30. When a flow rate of hydraulic oil to be returned is relatively high and is higher than the second predetermined flow rate, as shown in FIG. 9, the valve plate 30 is elastically deformed, and the valve plate 30, together with the holding member 22, is displaced in an axial direction X2 against an elastic urging force of the coil spring 24, to allow a circulation of more hydraulic oil.

In the third embodiment, an elasticity restoring force of the disc spring serving as the valve plate 30 that returns to a conical shape is thus exerted in a direction in which surface contact (solid abutment) between the disc spring and the valve seat 26B on the partition wall 23 is restrained, thereby making it possible to effectively prevent the valve plate 30 from being affixed to the valve seat 26 on the partition wall 23 and being not easily separated therefrom. Further, oil film cutting can be prevented from occurring by utilizing the disc spring serving as the valve plate 30, thereby making it possible to simplify a shape of the valve seat 26B in the partition wall 23 for preventing oil film cutting. Therefore, the flat valve seat 26B can be formed at low cost, for example. In order to obtain this effect, the valve seat 30 may comprise a disc spring.

Even when the outer edge 30*a* of the valve plate 30 and the valve seat 26B are brought into line contact, the annular oil chamber 70 can be formed between the valve plate 30 and the valve seat 26B in a portion other than a portion where they are brought into line contact. As a result, it is possible to more effectively prevent the valve plate 30 from being affixed to the valve seat 26 on the partition wall 23 and being not separated therefrom. Hydraulic oil with a low flow rate can be reliably prevented from being circulated by the outer edge 25a of the valve plate 30 while maintaining the above-mentioned line contact utilizing the elasticity restoring force of the by valve plate 30.

Figure 10:
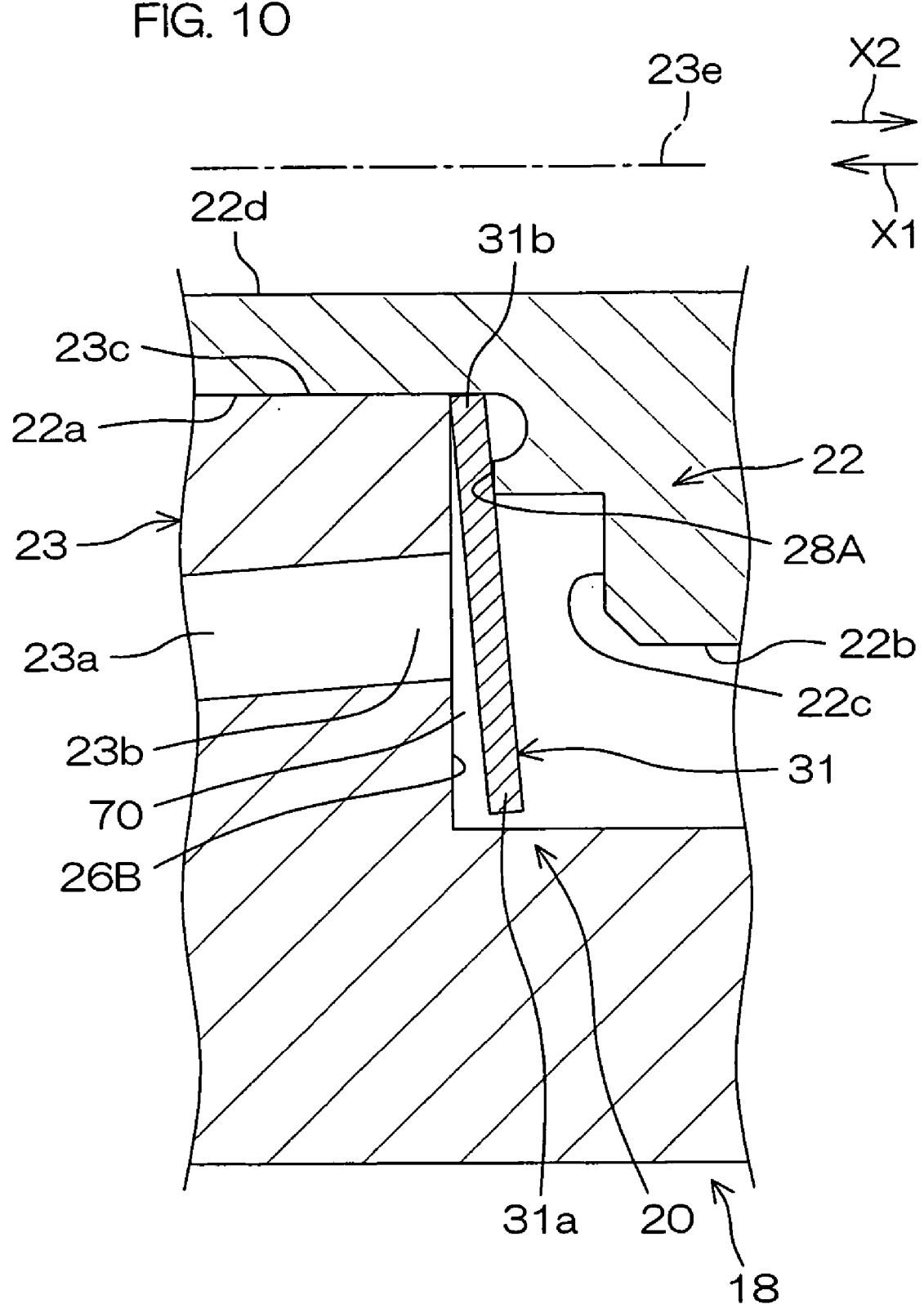
FIG. 10 is a cross-sectional view of a principal part in a state where a damper valve according to a fourth embodiment of the present invention is closed.

FIG. 10 is a cross-sectional view of a second valve 20 serving as a principal part of a damper valve according to a fourth embodiment of the present invention and peripheral portion of the second valve 20, showing a closed state.

In a damper valve 18 according to the fourth embodiment, the second valve 20 has a valve seat 26B serving as a valve seat and a valve plate 31. The valve plate 31 comprises a disc spring forming a conical shape in an unloaded state. The valve plate 31 is opposed to the valve seat 26B in an opposite direction to the valve plate 30 in the embodiment shown in FIG. 7. An intermediate portion in a radial direction of the valve plate 31 is urged by a coil spring 24 through a receiving section 28A in a holding member 22. In a state where the second valve 20 is closed, the valve plate 31 is urged by the coil spring 24 through the receiving section 28A of the holding member 22, so that only an inner edge 31b of the valve plate 31 is abutted against the valve seat 26 in a line contact state, and an outer edge 31a of the valve plate 31 is in close proximity to an inner periphery of a first chamber C1. In this state, the valve plate 31 covers an opening 23b but does not completely close the opening 23b.

Also in the fourth embodiment, it is possible to prevent the valve plate 31 from being affixed to the valve seat 26B in a partition wall 23 and being not easily separated therefrom, as in the third embodiment. A so-called ON/OFF feeling of a driver can be suppressed, as in the second embodiment.

In the third embodiment, it is also considered that only a portion of the valve plate 30 that is a portion abutted against that the valve seat 26B is formed into a disc spring, and the cross-sectional shape of the disc spring is brought into an R shape. The same modified example as this can be also considered in the fourth embodiment.

It is also considered that any one of the valve seats 26 and 26A and their modified examples and any one of the valve plates 30 and 31 and their modified examples are combined with each other to constitute the second valve 20.

In a hydraulic circuit for connecting the first output port 108d in the hydraulic control valve 108 and the first input port 106f in the hydraulic cylinder 106 as both ends thereof, a predetermined portion of the hydraulic circuit provided with the damper valve 18 may be one of the both ends or a portion intermediate therebetween. For example, the damper valve 18 may be provided inside the first output port 108d in the hydraulic control valve 108.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The present application corresponds to Japanese Patent Application No. 2005-32075 filed with the Japanese Patent Office on Feb. 8, 2005, the disclosure of which is hereinto incorporated by reference.

The invention claimed is:

1. A damper valve comprising:
    a casing having a first chamber, a second chamber, and a partition wall for separating the first chamber and the second chamber from each other;
    a supply path for supplying hydraulic oil in the first chamber to the second chamber;
    a return path for returning the hydraulic oil in the second chamber to the first chamber;
    a check valve provided in the supply path for regulating circulation of the hydraulic oil from the second chamber to the first chamber;
    a valve seat provided on the partition wall and facing the first chamber;
    an annular valve plate, which is elastically deformable, accommodated in the first chamber and opposed to the valve seat; and
    an urging member for urging a predetermined portion of the valve plate toward the valve seat, wherein
    the supply path comprises a penetration path that penetrates the partition wall along a predetermined axis,
    the return path comprises a communication path that communicates the first chamber and the second chamber with each other by penetrating the partition wall,
    the communication path has an opening formed on the valve seat,
    the valve plate produces an elasticity restoring force so as to establish a balance between an urging force provided by the urging member, and a reaction force provided by the valve plate,
    the valve plate is in line contact with the valve seat when keeping the balance, and
    either one of the valve seat or the valve plate is formed into a conical tapered shape centered around the predetermined axis so that when either one of an outer edge or an inner edge of the valve plate is abutted against the valve seat, an annular oil chamber is formed between the valve seat and the valve plate and the opening of the communication path communicating with the annular oil chamber.

2. The damper valve according to claim 1, wherein when either one of the outer edge or the inner edge of the valve plate is abutted against the valve seat, the other edge is separated from the valve seat.

3. The damper valve according to claim 2, wherein the valve plate comprises an annular disc spring.

4. The damper valve according to claim 1, wherein the valve plate comprises an annular disc spring.

5. The damper valve according to claim 4, wherein the disc spring has a conical tapered shape in an unloaded state.

6. The damper valve according to claim 5, further comprising a holding member for holding the disc spring so that the disc spring is movable along the predetermined axis, the urging member urging the disc spring toward the valve plate through the holding member.

7. The damper valve according to claim 4, further comprising a holding member for holding the disc spring so that the disc spring is movable along the predetermined axis, the urging member urging the disc spring toward the valve plate through the holding member.

8. The damper valve according to claim 7, wherein when an amount of returned hydraulic oil from the opening of the communication path is not less than a predetermined amount, the valve plate, together with the holding member, is displaced in a direction away from the valve seat against the urging member.

9. The damper valve according to claim 8, wherein
    the holding member has a cylindrical shape, and
    the supply path penetrates the holding member.

10. The damper valve according to claim 9, wherein
    the urging member comprises a coil spring centered around the predetermined axis, the holding member comprises a large-diameter section having a relatively large diameter and a small-diameter section having a relatively small diameter, and the large-diameter section of the holding member surrounds the coil spring, to guide expansion and contraction of the coil spring.

11. The damper valve according to claim 10, wherein the small-diameter section of the holding member is fitted in the penetration path in the supply path so as to be slidable along the predetermined axis.

12. The damper valve according to claim 11, wherein the holding member comprises a receiving section for receiving the inner edge of the disc spring, and the receiving section is formed between the large-diameter section and the small-diameter section.

13. The damper valve according to claim 1, wherein the check valve is arranged in the penetration path that penetrates the partition wall.

14. A hydraulic power steering apparatus comprising:

a hydraulic source;

an oil tank;

a hydraulic actuator having a pair of oil chambers for producing a steering assist force;

a control valve for connecting either one of the oil chambers in the hydraulic actuator to the hydraulic source and connecting the other of the oil chambers to the oil tank depending on a steering direction, a pair of connection paths for connecting the pair of oil chambers in the hydraulic actuator to a pair of ports in the control valve respectively; and a pair of damper valves provided in the pair of connection paths respectively, each of the damper valves comprising a casing having a first chamber, a second chamber, and a partition wall for separating the first chamber and the second chamber from each other, a supply path for supplying hydraulic oil in the first chamber to the second chamber, a return path for returning the hydraulic oil in the second chamber to the first chamber, a check valve provided in the supply path for regulating circulation of the hydraulic oil from the second chamber to the first chamber, a valve seat provided on the partition wall and facing the first chamber, an annular valve plate, which is elastically deformable, accommodated in the first chamber and opposed to the valve seat, and an urging member for urging a predetermined portion of the valve plate toward the valve seat, wherein the supply path comprises a penetration path that penetrates the partition wall along a predetermined axis, the return path comprises a communication path that communicates the first chamber and the second chamber with each other by penetrating the partition wall, the communication path has an opening formed on the valve seat, the valve plate produces an elasticity restoring force so as to establish a balance between an urging force provided by the urging member, and a reaction force provided by the valve plate, the valve plate is in line contact with the valve seat when keeping the balance, and either of the valve seat or the valve plate is formed into a conical tapered shape centered around the predetermined axis so that when either one of an outer edge or an inner edge of the valve plate is abutted against the valve seat, an annular oil chamber is formed between the valve seat and the valve plate and the opening of the communication path communicates with the annular oil chamber.

15. The hydraulic power steering apparatus according to claim 14, wherein the second chamber in each of the damper valves is connected to the corresponding oil chamber in the hydraulic actuator, and the first chamber in each of the damper valves is connected to the corresponding connection path.

* * * * *